United States Patent
Matschas (10) Patent No.: US 10,767,707 B2
(45) Date of Patent: Sep. 8, 2020

(54) COUPLING ASSEMBLY

(71) Applicant: ZF Friedrichshafen AG, Friedrichshafen (DE)

(72) Inventor: Steffen Matschas, Bad Bocklet-Aschach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 187 days.

(21) Appl. No.: 16/074,891

(22) PCT Filed: Jan. 5, 2017

(86) PCT No.: PCT/EP2017/050192
§ 371 (c)(1),
(2) Date: Aug. 2, 2018

(87) PCT Pub. No.: WO2017/137179
PCT Pub. Date: Aug. 17, 2017

(65) Prior Publication Data
US 2019/0032724 A1   Jan. 31, 2019

(30) Foreign Application Priority Data
Feb. 8, 2016   (DE) .................. 10 2016 201 870

(51) Int. Cl.
*F16D 25/0638* (2006.01)
*B60K 6/387* (2007.10)
(Continued)

(52) U.S. Cl.
CPC .......... *F16D 25/0638* (2013.01); *B60K 6/387* (2013.01); *B60K 6/485* (2013.01);
(Continued)

(58) Field of Classification Search
CPC .. B60K 6/48; B60K 6/387; B60K 6/40; F16D 25/0638; F16D 25/123; F16D 3/14;
(Continued)

(56) References Cited

U.S. PATENT DOCUMENTS

| 2005/0205379 A1* | 9/2005 | Tryon | F16D 25/0638 192/70.17 |
| 2005/0205382 A1* | 9/2005 | Tryon | F16D 25/0638 192/214 |

(Continued)

FOREIGN PATENT DOCUMENTS

| DE | 10125628 | 9/2002 |
| DE | 102006023288 | 11/2007 |
| DE | 102012209477 | 12/2012 |
| DE | 102013216510 | 3/2014 |

*Primary Examiner* — David R Morris
*Assistant Examiner* — Lori Wu
(74) *Attorney, Agent, or Firm* — Cozen O'Connor (57) ABSTRACT

A coupling arrangement for the powertrain of a vehicle with a clutch housing which is rotatable around a central axis is provided with a clutch mechanism with input-side clutch units) in operative connection with an input-side clutch unit carrier which is fixed with respect to rotation relative to the clutch housing and with output-side clutch units which are in operative connection with an output-side clutch unit carrier which is fixed with respect to rotation relative to a torsional vibration damper, and with a pressing device through which an operative connection between the input-side clutch units and the output-side clutch units can be produced or cancelled, and with a torsional vibration damper connecting the clutch mechanism to an output. The pressing device is provided axially between the torsional vibration damper and the clutch mechanism.

19 Claims, 8 Drawing Sheets

(51) Int. Cl.
*F16D 25/12* (2006.01)
*B60K 6/485* (2007.10)
*F16D 3/14* (2006.01)
B60K 6/48 (2007.10)
F16F 15/12 (2006.01)

(52) U.S. Cl.
CPC ............ *F16D 3/14* (2013.01); *F16D 25/123* (2013.01); *B60K 6/48* (2013.01); *F16F 15/12* (2013.01); *F16F 2236/08* (2013.01); *Y02T 10/6221* (2013.01); *Y02T 10/6226* (2013.01)

(58) Field of Classification Search
CPC ... F16F 15/12; F16F 2236/08; Y02T 10/6221; Y02T 10/6226
See application file for complete search history.

(56) References Cited

U.S. PATENT DOCUMENTS

| | | | |
|---|---|---|---|
| 2005/0224308 A1 | 10/2005 | Hauck | |
| 2007/0108857 A1 | 5/2007 | Nomura | |
| 2007/0267265 A1 | 11/2007 | Sudau | |
| 2008/0006502 A1* | 1/2008 | Sudau | F16D 25/0638 192/70.17 |
| 2008/0296113 A1 | 12/2008 | Naruse | |
| 2013/0068580 A1* | 3/2013 | Doegel | F16F 15/131 192/3.28 |
| 2014/0034443 A1 | 2/2014 | Reitz | |
| 2015/0001027 A1 | 1/2015 | Schröder | |
| 2016/0160975 A1* | 6/2016 | Depraete | F16H 45/02 192/3.29 |

* cited by examiner

COUPLING ASSEMBLY

PRIORITY CLAIM

This is a U.S. national stage of application No. PCT/EP2017/050192, filed on Jan. 5, 2017. Priority is claimed on the following application: Country: Germany, Application No.: 10 2016 201 870.1, filed: Feb. 8, 2016; the content of which is/are incorporated herein in its entirety by reference.

FIELD OF THE INVENTION

The present invention is directed to a coupling arrangement for the powertrain of a vehicle with a clutch housing which is rotatable around a central axis, provided with a clutch mechanism with input-side clutch units in operative connection with an input-side clutch unit carrier which is fixed with respect to rotation relative to the clutch housing and with output-side clutch units which are in operative connection with an output-side clutch unit carrier which is fixed with respect to rotation relative to a torsional vibration damper, and with a pressing device through which an operative connection between the input-side clutch units and the output-side clutch units can be produced or cancelled, and with a torsional vibration damper connecting the clutch mechanism to an output, wherein the torsional vibration damper is arranged adjacent to an input side of the clutch housing facing a drive, and the clutch mechanism is arranged adjacent to an output side of the clutch housing facing a driven end.

BACKGROUND OF THE INVENTION

A coupling arrangement of the type mentioned above is known from DE 10 2012 209 477 A1. The arrangement of the torsional vibration damper adjacent to the input side of the clutch housing facing a drive and the arrangement of the clutch mechanism adjacent to an output side of the clutch housing facing a driven end leads to a possible configuration of the clutch housing in which the clutch housing is appreciably larger radially at its input side facing a drive than at its output side facing a driven end. Accordingly, with respect to its outer dimensions, the clutch housing follows the inner configuration of a transmission housing constructed in a conventional manner such that the clutch housing can be inserted axially deep into the transmission housing and accordingly requires less axial installation space. At the same time, there is sufficient installation space for the torsional vibration damper so that the latter can be constructed not only with a plurality of damper units in radial direction but, beyond this, can also still have space for installing a mass damper system. Conversely, the clutch mechanism which requires appreciably less installation space in radial direction than the torsional vibration damper fits in a spatial region of the clutch housing which allows the clutch housing to afford installation space for transmission components radially outwardly of the clutch units and radially inwardly of the clutch units. However, in the known coupling arrangement the pressing device serving to produce or cancel an operative connection between the input-side clutch units and output-side clutch units is arranged directly adjacent to the output side facing a driven end and must be supplied with flow medium via comparatively long flow paths.

SUMMARY OF THE INVENTION

It is an object of the invention to configure a coupling arrangement which is extremely compact in axial direction such that the pressing device which serves to produce or cancel an operative connection between the input-side clutch units and the output-side clutch units can be supplied with flow medium via short flow paths.

In order to meet the above-stated object, it is provided to configure a coupling arrangement for the powertrain of a vehicle with a clutch housing which is rotatable around a central axis, provided with a clutch mechanism with input-side clutch units in operative connection with an input-side clutch unit carrier which is fixed with respect to rotation relative to the clutch housing and with output-side clutch units which are in operative connection with an output-side clutch unit carrier which is fixed with respect to rotation relative to a torsional vibration damper, and with a pressing device through which an operative connection between the input-side clutch units and the output-side clutch units can be produced or cancelled, and with a torsional vibration damper connecting the clutch mechanism to an output, wherein the torsional vibration damper is arranged adjacent to an input side of the clutch housing facing a drive, and the clutch mechanism is arranged adjacent to an output side of the clutch housing facing a driven end.

In particular, the pressing device in this coupling arrangement is provided axially between the torsional vibration damper and the clutch mechanism.

By arranging the pressing device axially between the torsional vibration damper and the clutch mechanism, the pressing device is located in that axial area of the coupling arrangement in which the clutch housing is drawn radially inward to the extent that, on the input side, it preferably reaches up to a central axis of the clutch housing and, on the output side, a housing hub is preferably moved up until close to the radial extension area of a transmission input shaft serving as driven end. Consequently, flow medium which has been conveyed from an external flow medium reservoir to this axial area in an at least substantially axial flow direction need only be redirected radially outward to arrive in the interior of the clutch housing and, accordingly, to reach the pressing device. Therefore, a switching of the pressing device between producing an operative connection between the input-side clutch units and the output-side clutch units, i.e., an engagement process, and cancelling an operative connection between the input-side clutch units and the output-side clutch units, i.e., a disengagement process, is carried out very expeditiously.

The pressing device is preferably connected via the input-side clutch unit carrier to co-rotate with the clutch housing and is accordingly moved at the rate of rotation of the input-side clutch units. Since the torsional vibration damper connects the clutch mechanism, particularly the output-side clutch unit carrier, to an output, there is a relative rotational movement between the pressing device and the torsional vibration damper regardless of which constructional unit of the torsional vibration damper is being considered. Since the pressing device faces the torsional vibration damper with its side remote of the clutch mechanism, it is possible to axially limit the lift-off path of the pressing device from the clutch mechanism through a constructional unit of the torsional vibration damper. In order to receive a relative movement dependent upon the operating state between the pressing device and the selected constructional unit of the torsional vibration damper, a bearing is used by which the pressing device is axially supported at the corresponding constructional unit of the torsional vibration damper. Since the pressing device occupies its disengagement position in this case and therefore need not apply any axial force as would be the case in its engagement position, it is irrelevant whether the corresponding constructional unit of the torsional vibration damper is axially elastic or axially rigid. Accordingly, a conventionally constructed cover plate of the torsional vibration damper can also act as a constructional unit for axially supporting the pressing device. Likewise, it is irrelevant that the above-mentioned constructional unit 41 of the torsional vibration damper 48 is axially supported at the torsional vibration damper hub 56 in the disengaged position of the disconnecting device 30. The reason for this is that the torsional vibration damper 48 is inoperative when the disconnecting device 30 is in the disengaged position and, accordingly, there is no relative rotational movement in spite of the second energy storage unit 55 arranged in working direction between the constructional unit 41 and the torsional vibration damper hub 56.

On the radial inner side, the pressing device is preferably centered and received in a pressure-tight manner on a torsional vibration damper hub serving as output via a pressure disk. In this way, not only can flow medium that has been conveyed in an at least substantially axial flow direction from an external flow medium reservoir to this pressure disk be redirected radially outward and accordingly into the interior of the clutch housing by at least one channel in the pressure disk but, in addition, there takes place a pressure-tight insulation of the pressure chambers which are provided on both sides of the pressing device and which define the associated movement direction of the pressing device as a result of their respective pressure impingement.

In a particularly advantageous embodiment, the pressing device has a sealing plate at its radially inner end for maintaining the centered, pressure-tight reception at the pressure disk and possibly for guiding the bearing support between the pressing device and the torsional vibration damper. The sealing plate provides a sealing surface at a side facing the pressure disk, which sealing surface axially overlaps the area of a sealing of the pressure disk at least by an amount corresponding to the axial movement distance of the pressing device. In this way, it is ensured that the sealing plate always communicates with the sealing relative to the pressure disk regardless of the particular axial position of the pressing device. In a particularly advantageous manner, the torsional vibration damper hub serving as output is axially supported at the clutch housing in direction of the output side of the clutch housing via the pressure disk. Conversely, the pressure disk is supported in direction of the input side of the clutch housing via the torsional vibration damper hub serving as output.

The input-side clutch unit carrier which is fixed to rotate with the pressing device receives a feeding device for flow medium contained in the clutch housing so as to be at least substantially fixed with respect to rotation relative to it, but the feeding device is only associated with the input-side clutch unit carrier and has a feeding device. Accordingly, like the input-side clutch unit carrier, the feeding device remains an independent constructional unit and can be optimized for the intended use with respect to the constructional layout and also with respect to the choice of material not only in terms of function but also with respect to cost. Metal, for example, can preferably be used as material for the feeding device so as to render the feeding device as resistant to wear as possible. However, it may also be useful to produce the feeding device from plastic so that it is inexpensive and runs quietly during operation. In particular, it is possible to produce the feeding device as a plastic injection-molded part, as a metal die-cast part or as a sintered part.

The feeding device preferably has a driver arrangement which is responsible for connecting the feeding device to the input-side clutch unit carrier and/or to the pressing device so as to be fixed with respect to relative rotation. Owing to the fact that the input-side clutch unit carrier is fixed with respect to rotation relative to the clutch housing, the feeding device and/or the pressing device are/is also connected to the clutch housing so as to be fixed with respect to rotation relative to it because of the connection produced by the driver arrangement. Consequently, during rotation of the clutch housing around a central axis, the input-side clutch unit carrier and the feeding device and/or the pressing device are guided so as to experience the same movement. In contrast, the output-side clutch unit carrier and therefore the output-side clutch units follow in the same movement as a rotation of the driven end so that during pull operation, i.e., when the input-side speed is higher than the output-side speed, a pressure difference is generated in the clutch housing so that, as a result, flow medium contained in the clutch housing is sucked into the feeding device and conveyed radially outward from there. When the clutch units of the clutch mechanism are arranged radially outwardly of the feeding device, the flow medium is conveyed through the feeding device directly to the clutch units, where friction heat occurs during relative rotational movement. This enables the flow medium to cool the clutch units in an intensive manner. The return movement of the flow radially inward then takes place on the side of the output-side clutch unit carrier.

The required flow can be achieved in a particularly simple manner when the driver arrangement of the feeding device has at least one flow passage which engages in a corresponding cutout of the input-side clutch unit carrier and/or of the pressing device to connect the feeding device for co-rotation with the input-side clutch unit carrier and/or with the pressing device, particularly preferably while preserving a positive engagement. Based on this construction, a flow passage which is necessary in any case is utilized for a secondary function, namely, to connect the input-side clutch unit carrier for co-rotation with the feeding device and/or with the pressing device. Further, the flow passage is located at exactly that location at which the feeding device, according to its function, provides for the conveying action of the flow medium.

In a particularly preferred manner, the feeding device is formed with a support which receives the driver arrangement at a side facing the input-side clutch unit carrier and which has a blading influencing the movement of the flow medium at a side remote of the driver arrangement. This results in a constructional unit that is dimensionally stable due to the support. By placing the driver arrangement and the blading on different sides of the support, these devices are not only separated functionally, but are also arranged in different installation spaces. This type of configuration of the feeding device is especially advantageous when this feeding device is realized as a plastic injection-molded part, die-cast metal part or sintered part.

Particularly when the feeding device is constructed with a support, the feeding device can be utilized as centering aid for at least one disconnecting device for clutch units. To this end, the disconnecting device acts on clutch units which are adjacent to one another so that these clutch units are acted upon by axial forces in direction facing away from one another. This results in the following advantages:

When the clutch mechanism is engaged, i.e., when the input-side clutch units are at least partially brought into operative connection with the output-side clutch units by introducing an axial force via the pressing device, a positive pressure must be built up on the side of the pressing device remote of the clutch units in order to displace the pressing device axially in direction of the clutch units and accordingly to direct the above-mentioned axial force to the clutch units. This pressure difference is subject not only to friction influences which become noticeable in particular when the pressing device begins to move, but also to tolerance influences, e.g., variations in thickness in the relevant clutch units, particularly in the area immediately surrounding the pressing device, which can cause an uncoordinated movement in direction of the clutch units. The effect of the above-mentioned influences can at least be mitigated when the engagement of the clutch mechanism takes place against the action of an energy storage which, in the case of the disconnecting device, is formed by the disconnecting elements which operate between clutch units which are adjacent to one another. Owing to the fact that the disconnecting elements apply axial forces to the mutually adjacent clutch units in direction away from one another, the pressing device must also overcome additional resistance built up by the disconnecting device during engagement of the clutch mechanism. Therefore, in a particularly preferred manner the disconnecting device should have a suitable force-travel characteristic. Tolerance-induced bucking during starting is effectively prevented in this way.

When the clutch mechanism is disengaged, i.e., when the operative connection between the input-side clutch units and the output-side clutch units is at least partially cancelled by reducing the pressing force exerted by the pressing device, a positive pressure must be built up on the side of the pressing device facing the clutch units in order to displace the pressing device in direction facing away axially from the clutch units and, therefore, to reduce or even completely eliminate the above-mentioned axial force on the clutch units. If in so doing the clutch units are not completely disengaged from one another, it can be assumed that there would be loss-promoting drag torques between the clutch units. In this regard, there is also an advantageous effect of the disconnecting device in that the latter impinges on clutch units which are adjacent to one another with axial forces in direction facing away from each other and accordingly completely separates them.

The disconnecting device cooperates very advantageously with the feeding device particularly when at least one of the two devices is at least substantially annular and surrounds a central axis of the clutch housing.

In a preferred configuration of the input-side clutch unit carrier, the latter at least partially surrounds at least the feeding device but possibly also the disconnecting device. Owing to this nested construction, the entire constructional unit comprising input-side clutch unit carrier, feeding device and possibly the disconnecting device can be formed compactly overall. Accordingly, the input-side clutch unit carrier is allotted the function of a housing of the feeding device which receives the feeding device.

BRIEF DESCRIPTION OF THE DRAWINGS

The invention is described more fully with reference to an embodiment example. The drawings show.

DETAILED DESCRIPTION OF THE PRESENTLY PREFERRED EMBODIMENTS

Figure 1:
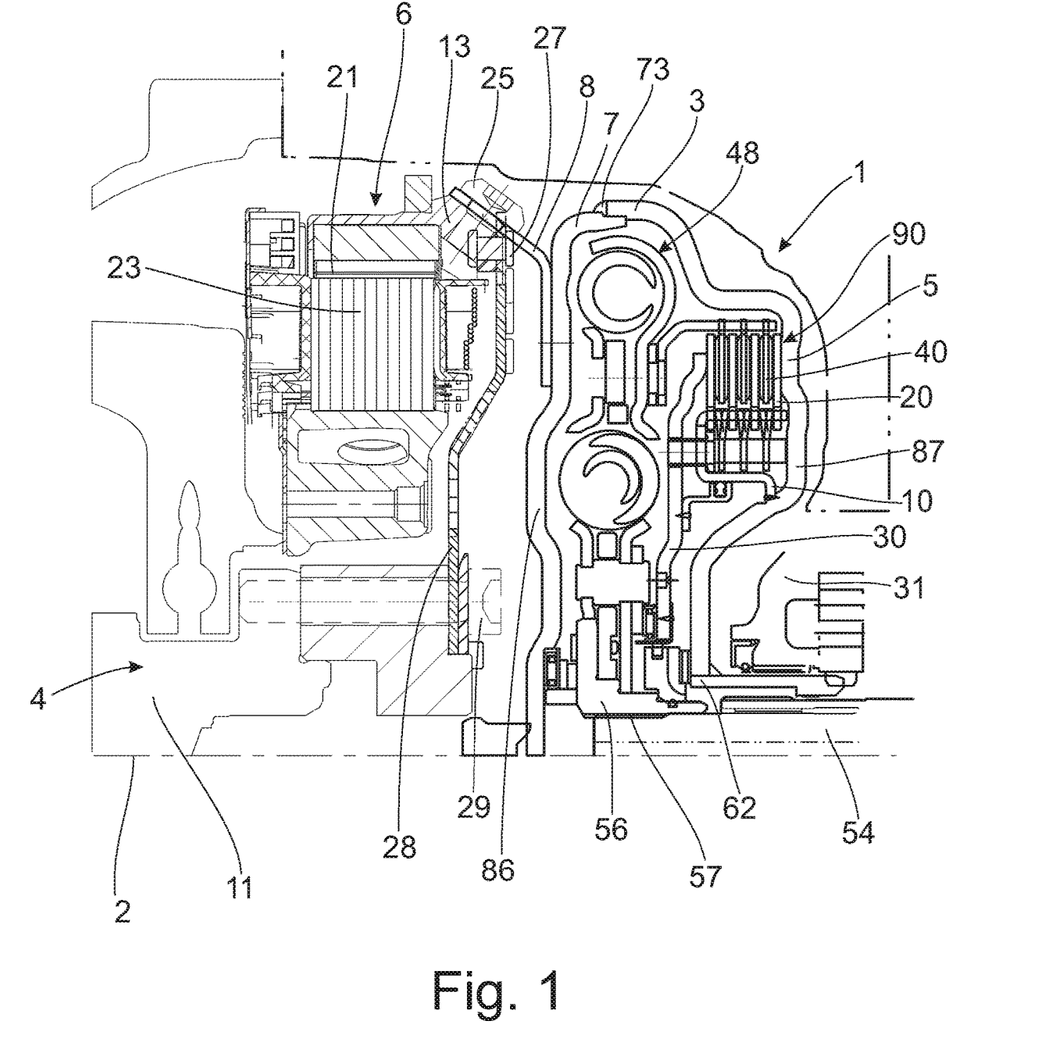
FIG. 1 a sectional view of a coupling arrangement connected to a crankshaft of an internal combustion engine as first drive and to a rotor of an electric machine as second drive and having a clutch mechanism, a pressing device, a feeding device, a disconnecting device and a torsional vibration damper whose output engages a driven end in the form of a transmission input shaft.

In a schematically depicted transmission housing 31, FIG. 1 shows a coupling arrangement 1 provided for the powertrain of a vehicle. The coupling arrangement 1 has a clutch housing 3 which is rotatable around a central axis 2 and which has a housing cover 7 at an input side 86 and a housing shell 5 at an output side 87. The housing cover 7 and housing shell 5 are connected to one another by a weld 73 and enclose a wet space containing a flow medium, for example, oil. In the radially outer area of the housing cover 7 at the side thereof remote of the wet space, the clutch housing 3 has drivers 8 which are connected to a rotor 13 of an electric machine 21 using a first connector 25. This rotor 13 engages a driver disk 28 via a second connector 27, this driver disk 28 being connected via a third connector 29 to a crankshaft 11 of an internal combustion engine, not shown, so as to be fixed with respect to rotation relative to the crankshaft 11. The connection produced by the driver disk 28 between the rotor 13 of the electric machine 21 and the crankshaft 11 is fixed with respect to rotation in circumferential direction but can be compliant in axial direction. The crankshaft 11 is part of a first drive 4, and the rotor 13 is part of a second drive 6, namely of the electric machine 21 which has a stator 23 as is conventional.

Figure 2:
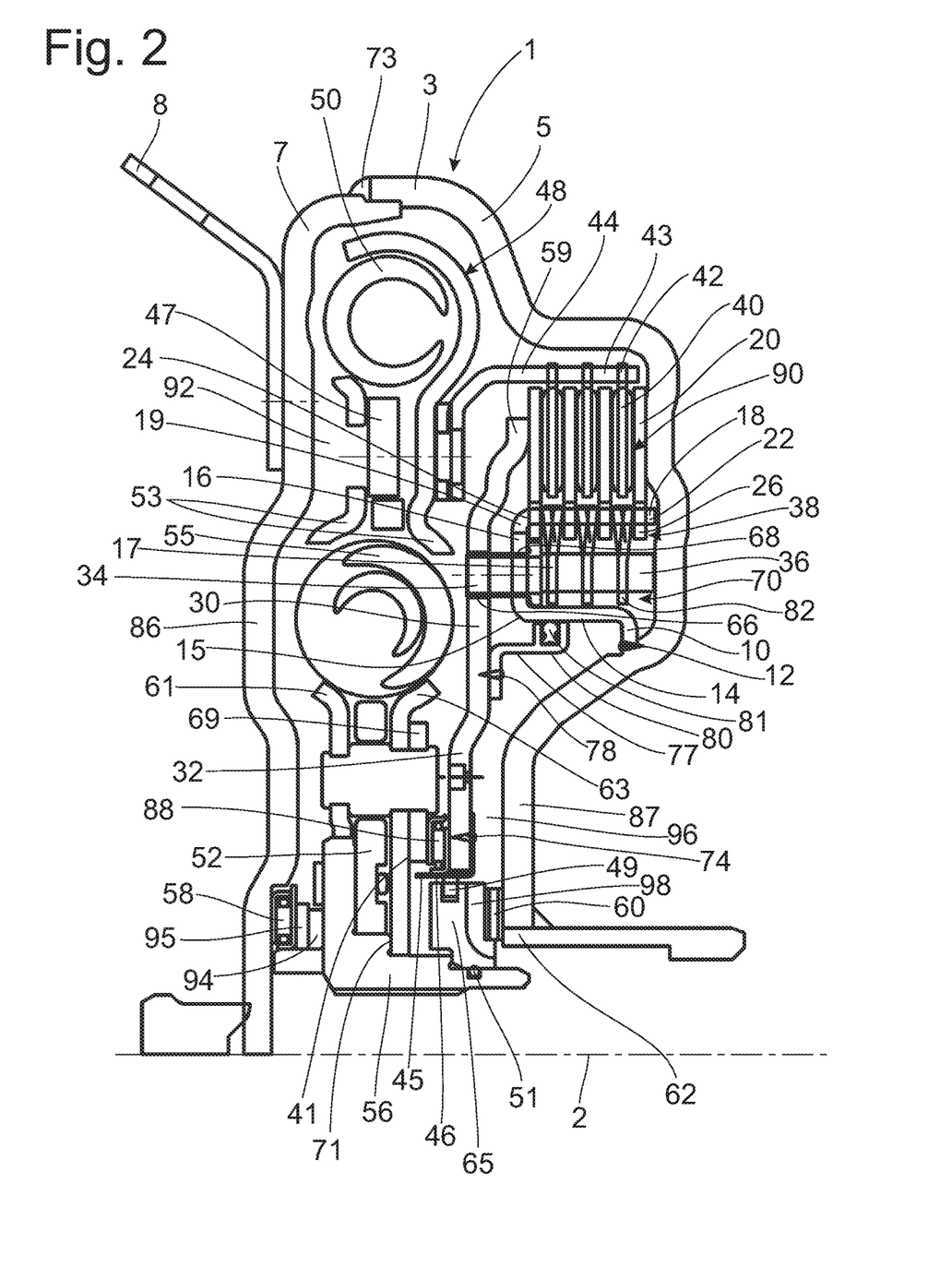
FIG. 2 a sectional view showing an enlarged detail of the coupling arrangement.

As is clearly shown in FIG. 2, an input-side clutch unit carrier 10 is fastened, for example, by a weld 12, in the wet space of the clutch housing 3 at the housing shell 5 of the latter. The input-side clutch unit carrier 10 which is also shown as a detail in FIGS. 3 and 4 extends radially outside of the weld 12 initially by a radially inner leg 14 in direction of the housing cover 7 so as to merge by a first bend 15 in a radial connection 16 to a radially outer leg 18. The radially outer leg 18 proceeds from the radial connection 16 by a second bend 19 and extends in direction of housing shell 5.

Figures 3, 4:
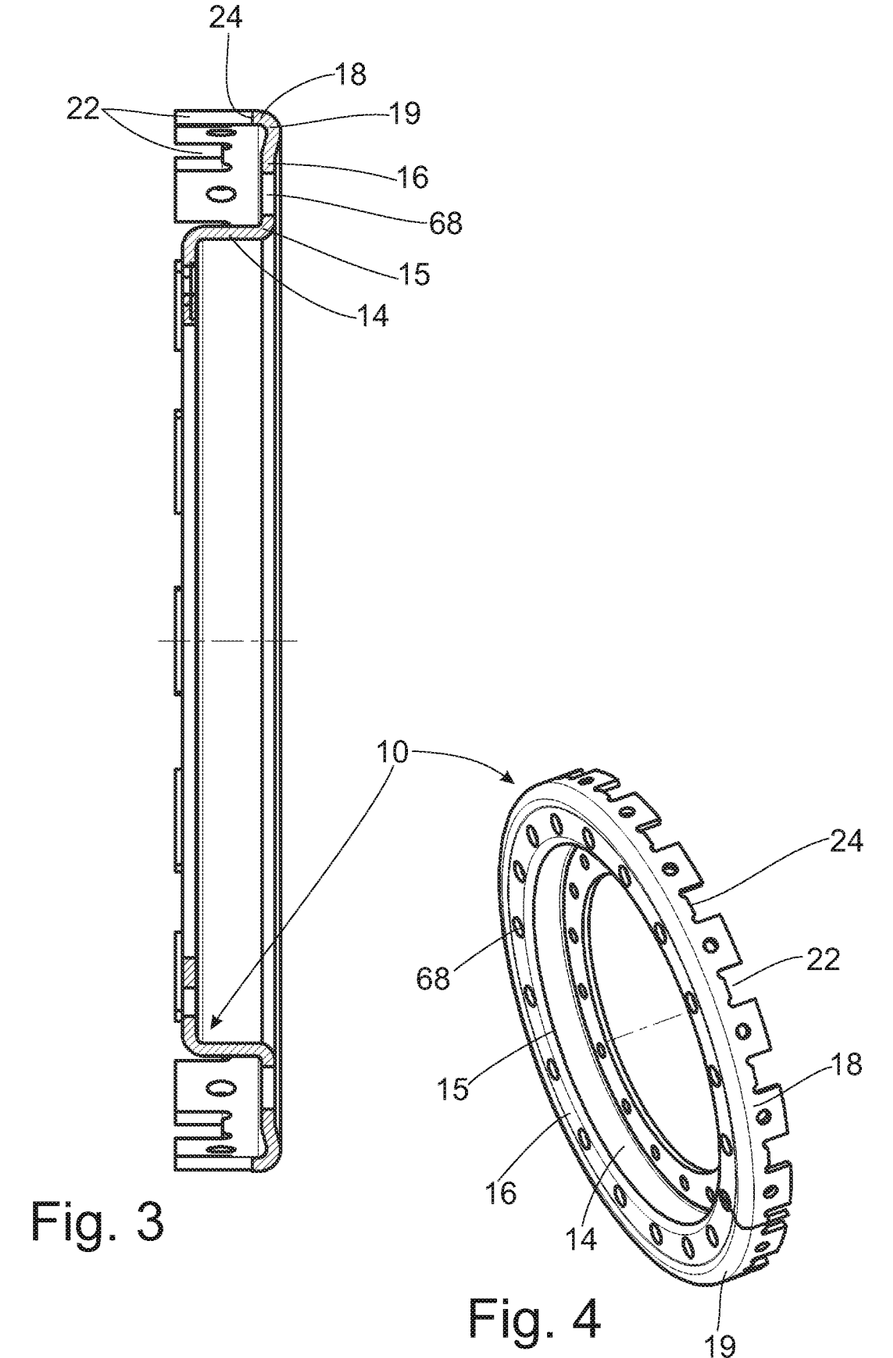
FIG. 3 a detail of an input-side clutch unit carrier of the clutch mechanism shown in FIG. 1 or 2 as individual component part, in longitudinal section.
FIG. 4 like FIG. 3, but with a three-dimensional representation of the input-side clutch unit carrier.

In order to receive input-side clutch units 20 so as to be secured against rotation but so as to be displaceable, the radially outer leg 18 of the input-side clutch unit carrier 10 has in circumferential direction a plurality of cutouts 22 which are open at their ends facing the housing shell 5, while they terminate in direction of the second bend 19 at a limit of the radially outer leg 18 acting as stop 24. The input-side clutch units 20, already mentioned, extend with radially inwardly facing radial projections 26 into the cutouts 22 of the input-side clutch unit carrier 10, and the input-side clutch unit 20 at the greatest distance from the housing shell 5 can be axially supported at the stop 24. A pressing device 30 in the form of a clutch piston 32 can be brought into contact with this input-side clutch unit 20.

An output-side clutch unit 40 extends in each instance axially between every two input-side clutch units 20. The output-side clutch units 40 have radially outwardly facing radial projections 42 by which they engage in cutouts 43 of an output-side clutch unit carrier 44 so as to be secured against rotation but so as to be axially displaceable.

While the input-side clutch units 20 are formed in each instance by steel disks, the output side clutch units 40 have friction linings on both sides of friction lining carriers. These friction linings can be formed with grooves for the circulation of flow medium.

The output-side clutch unit carrier 44 cooperates with an input 47 of a torsional vibration damper 48, this input 47 being connected via a first energy storage unit 50 to an intermediate transmission device 53 which forms the output of the first energy storage unit 50 and the input of a second energy storage unit 55. The intermediate transmission device 53 is formed by an input-side cover plate 61 adjacent to the housing cover 7 and by an output-side cover plate 63 adjacent to the pressing device 30. The output 52 of the second energy storage unit 55 which can be controlled by the intermediate transmission device 53 is connected to a torsional vibration damper hub 56 so as to be fixed with respect to rotation relative to it and, as is shown in FIG. 1, this torsional vibration damper hub 56 is connected via a toothing 57 to a transmission input shaft acting as driven end 54 so as to be fixed with respect to rotation relative to it.

The torsional vibration damper hub 56 is supported via a thrust bearing 58 at the housing cover 7 and, accordingly, at the input side 86 of the coupling arrangement 1. Housing cover 7 is drawn inward radially up to the central axis 2. At the output side 87 at which the housing shell 5 and a housing hub 62 of the clutch housing 3 are provided, this housing hub 62 being associated radially inwardly with the housing shell 5, the torsional vibration damper hub 56 is supported at the housing hub 62 via a pressure disk 65 and a second thrust bearing 60. For this purpose, the torsional vibration damper hub 56 is connected in a positive engagement with the pressure disk 65. As is shown in FIG. 1, the housing hub 62 is brought forward radially until close to the driven end 54.

The pressure disk 65 has passages 98 for flow medium and is sealed radially outwardly via a first sealing 49 relative to a sealing surface 46 of a sealing plate 45 which is associated with the pressing device 30 and which is fastened to the latter, for example, by weld 74. The pressure disk 65 is sealed radially inwardly relative to the torsional vibration damper hub 56 via a second sealing 51.

The sealing plate 45 overlaps the radially inner end of the pressing device 30 and extends in axial direction at least to the extent that its sealing surface 46 overlaps the area of the sealing 49 at least along the axial movement path of the pressing device 30. Further, the radial outer side of the sealing plate 45 centers a bearing 88 which is supported at the pressing device 30 on one side and at a constructional unit 41 of the torsional vibration damper 48 on the other side. The constructional unit 41 is formed by the output-side cover plate 63 of the intermediate transmission device 53 and by a stiffening plate 69 which stiffens the output-side cover plate 63 in the radial extension area of the bearing 88. Since the output-side cover plate 63 is supported in direction of the housing cover 7 at a radial projection 71 of the torsional vibration damper hub 56, the movement of the pressing device 30 is limited in direction of the housing cover 7 by constructional unit 41 and bearing 88. In this connection, any elasticity of the cover plate 63 in axial direction is not critical because the pressing device 30 exerts only minimal forces in axial direction when it is supported at the torsional vibration damper hub 56 via bearing 88 and constructional unit 41.

The clutch piston 32 of the pressing device 30 is formed in the radially outer region with a protrusion 59 facing in direction of the clutch units 20, 40, by which the pressing device 30 can be brought into operative connection with the adjacent input-side clutch unit 20 during the engagement movement of the pressing device 30.

Radially inwardly of the protrusion 59, the clutch piston 32 of the pressing device 30 is provided with cutouts 66, and a flow passage 34 which is at least substantially tubular is received in each instance in one of these cutouts 66 so as to be fixed with respect to rotation but axially displaceable relative to it. Further, each of these flow passages 34 penetrates cutouts 68 in the input-side clutch unit carrier 10 and runs into a support 36 of a feeding device 38 which is also shown as detail in FIGS. 5 to 7. The flow passages 34, one of which is shown in an enlarged view as detail Z in FIG. 8, are received in the cutouts 68 of the input-side clutch unit carrier 10 so as to be fixed with respect to rotation relative to it such that the feeding device 38 is connected via flow passages 34 to the input-side clutch unit carrier 10 on the one hand and to the pressing device 30 on the other hand so as to be fixed with respect to relative rotation. Therefore, the flow passages 34 act as driver arrangement 70 of the feeding device 38. The feeding device 38 is preferably produced as a plastic injection-molded part, a die-cast metal part or as a sintered part.

Figure 5:
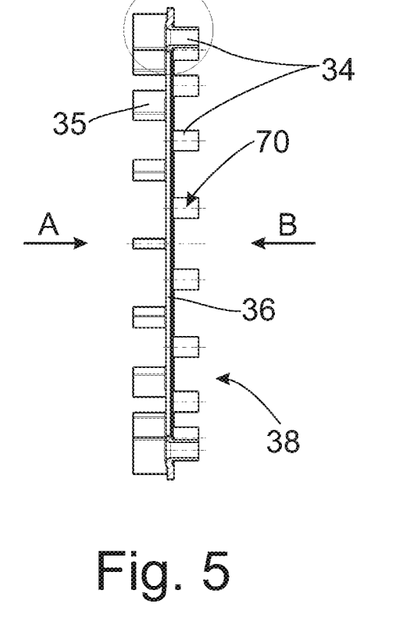
FIG. 5 a detail of the feeding device shown in FIG. 1 or FIG. 2, in longitudinal section.
Figure 6:
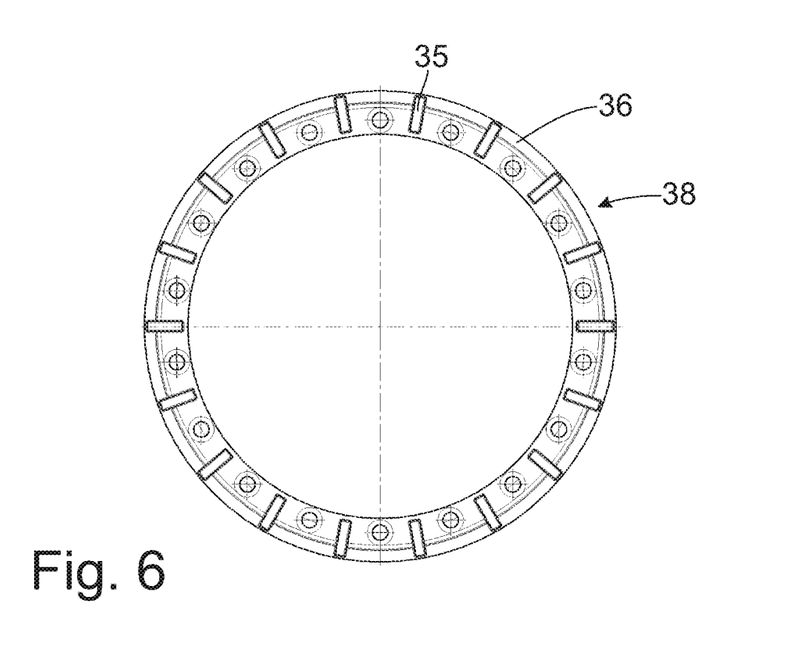
FIG. 6 the feeding device from viewing direction A in FIG. 5.

On the side of the support 36 remote of the flow passages 34, the feeding device 38 has a blading 35 (FIGS. 5 and 6) which, depending on the required flow conditions in the clutch housing 3, runs between its respective radially inner end and its respective radially outer end either in an at least substantially straight line as is shown in FIGS. 5 and 6 or has a curvature.

Figure 7:
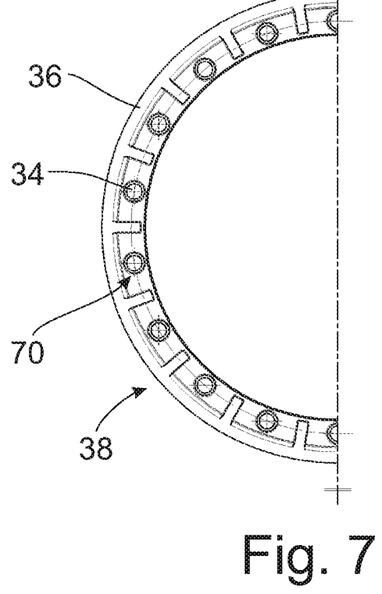
FIG. 7 the feeding device from viewing direction B in FIG. 5.
Figure 8:
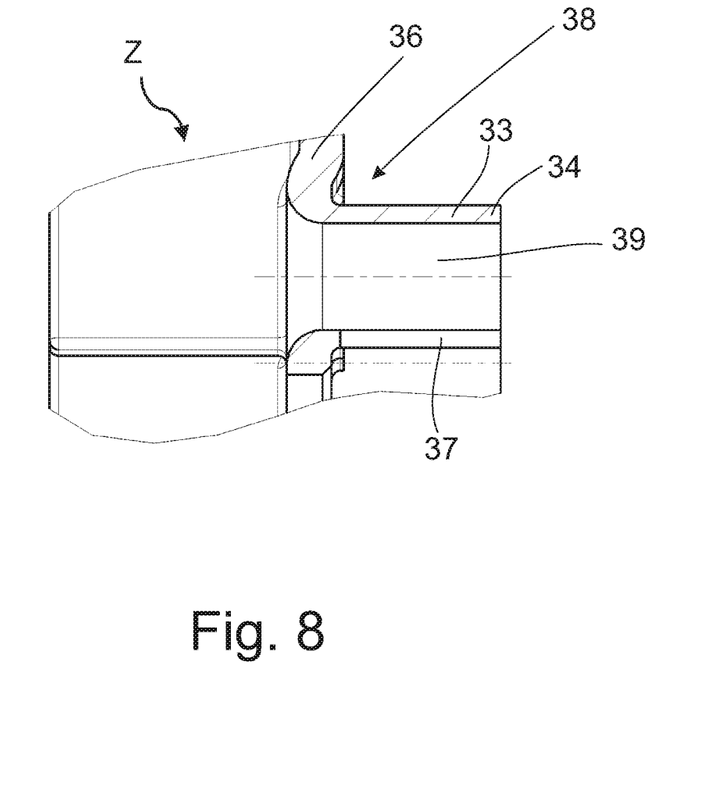
FIG. 8 a detail of portion Z in FIG. 5.

As is shown in FIGS. 5 to 7, the flow passages 34 can be formed in each instance as tubes with closed tube areas 33 at their circumferences. However, it is also conceivable to form the flow passages 34 with partial openings 37 at their circumferences as is shown in FIG. 8. These partial openings 37 can be provided at any location of the respective tube. Regardless of this, the tubes each have a passage 39 (FIG. 8) for flow medium.

As can be seen clearly from FIG. 2, the input-side clutch unit carrier 10 is at least substantially U-shaped in cross section owing to the above-described arrangement of radially inner leg 14, radial connection 16 and radially outer leg 18 and accordingly, together with the housing shell 5, defines a space which serves to receive the feeding device 38 and which can also be used to receive a disconnecting device 17.

A seal receptacle 77 is fastened, for example, by a weld 78, to the clutch piston 32 of the pressing device 30 at the side facing the housing shell 5. The seal receptacle 77 receives a seal 81 in a recess which is bounded in a U-shaped manner. The seal 81 contacts the side of the radially inner leg 14 of the input-side clutch unit carrier 10, which side is remote of the feeding device 38. Like seal 81, seal receptacle 77 is part of a sealing 80 acting between the input-side clutch unit carrier 10 and the pressing device 30.

Figure 9:
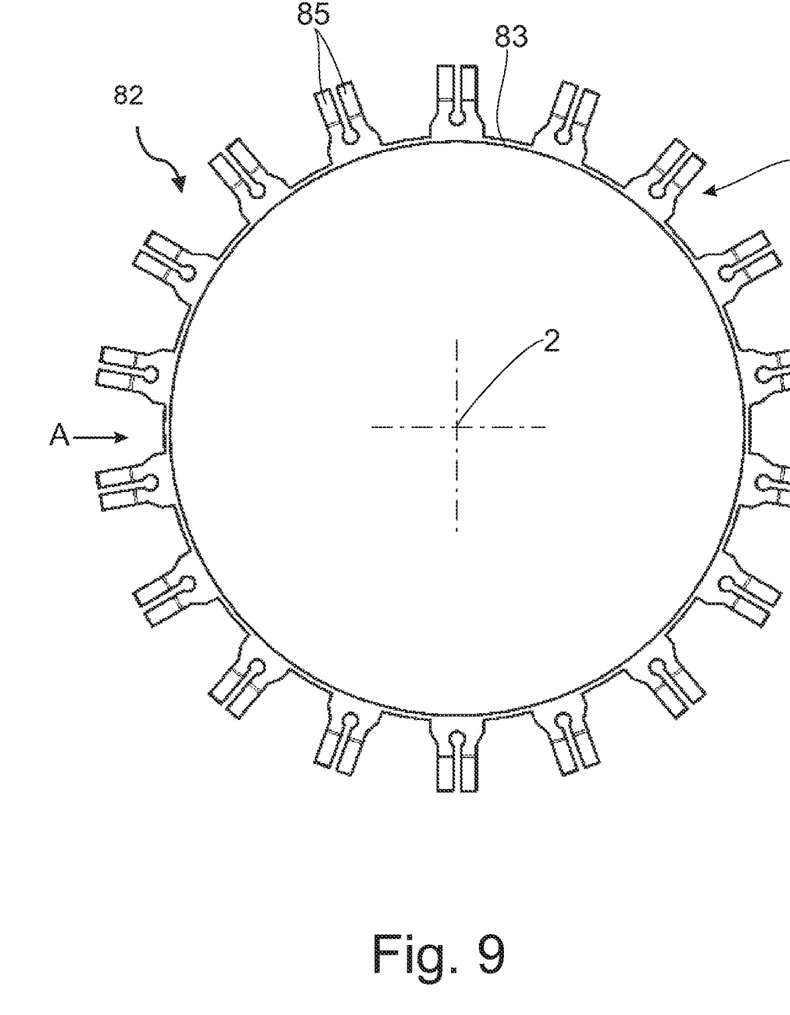
FIG. 9 a detail of the disconnecting device shown in FIG. 1 or FIG. 2 in a top view with annular support part.
Figure 10:
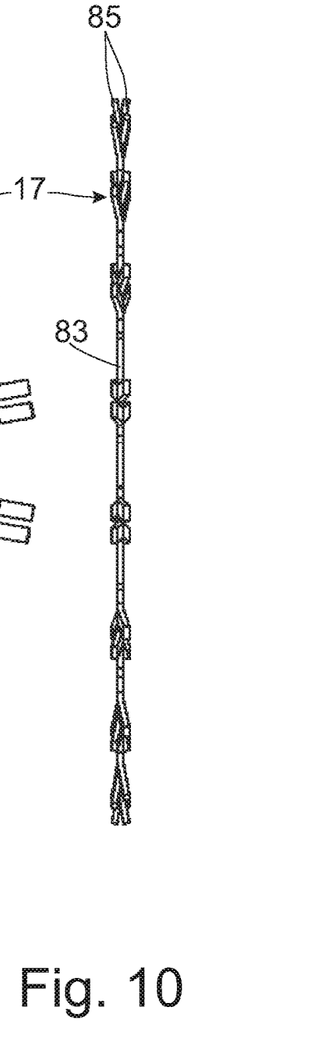
FIG. 10 a disconnecting device as in FIG. 9 in viewing direction A in FIG. 9.

As can be seen more clearly in FIGS. 9 and 10, the disconnecting device 17 has disconnecting units 82 with a support part 83 annularly enclosing the central axis 2. Disconnecting elements 85 in the form of spring arms which are provided in pairs in circumferential direction and which are intertwined with one another project radially outward from the support part 83. Owing to the intertwining, one disconnecting element 85 of every pair of disconnecting elements projects in direction of the housing cover 7 with respect to the axial plane of the support part 83, while the other disconnecting element 85 projects in direction of the housing shell 5. Accordingly, the disconnecting elements 85 have the effect of pressing apart the input-side clutch units 20 between which they engage axially. Since all of the pairs of disconnecting elements in a disconnecting unit 82 are fitted on a shared support part 83, torques which could lead to a tilting movement of the disconnecting device 17 relative to the input-side clutch units 20 cancel each other out.

As shown in FIG. 2, the disconnecting units 82 can be centered at the radial inner side of the feeding device 38, particularly at the blading 35 thereof, via the shared support part 83. The pair of disconnecting elements have a distance from one another in circumferential direction that is determined by the circumferential spacing of the individual blades of the blading 35 of the feeding device 38.

Like the clutch unit carriers 10 and 44, the pressing device 30 and possibly the disconnecting device 17, the clutch units 20 and 40 are part of a clutch mechanism 90.

A pressure chamber 92 which is supplied with flow medium proceeding from the area of the central axis 2 via a pressure connection is provided axially between the housing cover 7 and the pressing device 30. A passage 94 associated with this pressure connection is provided adjacent to the torsional vibration damper hub 56 axially between the latter, the thrust bearing 58 adjacent to the housing cover 7, and a supporting disk 95 associated with the thrust bearing 58. A cooling chamber 96 which at least partially encloses, inter alia, the clutch units 20 and 40, the clutch unit carriers 10 and 44 and the disconnecting device 17 is located on the other side of the pressing device 30. The supply of flow medium to the cooling chamber 96 is carried out via a pressure connection with which is associated the passage 98 in the pressure disk 65 which is provided axially between the torsional vibration damper hub 56 and the housing hub 62. The sealing 80 is provided to ensure an adjusted pressure difference between the pressure chamber 92 and the cooling chamber 96.

To disengage the clutch 90, a positive pressure is adjusted in the pressure chamber 92 in that flow medium is introduced into the cooling chamber 96 through the pressure connection, hereinafter first pressure connection, which is associated with the passage 98 provided in the pressure disk 65. At the same time, flow medium is released from the pressure chamber 92 via the pressure connection which is associated with passage 94 which is adjacent to housing cover 7. The clutch piston 32 of the pressing device 30 is accordingly displaced in direction facing away from the clutch units 20 and 40 so as initially to reduce the axial force transmitted to the clutch units 20 and 40 with the aid of the spring arms 85 of the disconnecting device 17 which engage axially between the clutch units 20 and which are interlaced with one another and, finally, to lift the input-side clutch 20 adjacent to the pressing element 30. Also, during this movement of the pressing device 30, the flow passages 94 of the driver arrangement 70 of the feeding device 38 are displaced axially relative to the cutouts 66 of the pressing device 30 which receive these flow passages 34, and the sealing 80 also undergoes an axial displacement relative to the input-side clutch unit carrier 10. The movement terminates when the pressing device 30 makes contact with the constructional unit 41 of the torsional vibration damper 48 via bearing 88.

In order to engage the clutch mechanism 90, a positive pressure is adjusted in the pressure chamber 92 in that flow medium is guided into the pressure chamber 92 through the second pressure connection which is associated with the passage 94 adjacent to the housing cover 7. At the same time, flow medium is released from the cooling chamber 96 via the first pressure connection which is associated with the passage 98 adjacent to the pressure disk 65. The clutch piston 32 of the pressing device 30 is accordingly displaced in direction of the clutch units 20 and 40 to come in contact initially with the input-side clutch unit 20 adjacent to the pressing element 30 and subsequently to transmit an axial force so that clutch units 20 and 40 are brought into operative connection with one another against the action of the spring arms 85 of the disconnecting device 17 which extend axially between the clutch units 20 and which are intertwined with one another. Also during this movement of the pressing device 30, the flow passages 34 of the driver arrangement 70 of the feeding device 38 are displaced axially relative to the cutouts 66 of the pressing device 30 which receive these flow passages 34, and the sealing 80 also undergoes an axial displacement relative to the input-side clutch unit carrier 10.

As has already been mentioned, the flow passages 34 are received so as to be fixed with respect to relative rotation at the support 36 of the feeding device 38 and, therefore, so as to be fixed with respect to relative rotation at the feeding device 38, but also so as to be fixed with respect to relative rotation in the cutouts 38 of the input-side clutch unit carrier 10. Owing to the fact that the input-side clutch unit carrier 10 is in turn received so as to be fixed with respect to relative rotation at the housing shell 5 and, therefore, at the clutch housing 3, the feeding device 38 is made to follow the movement of the clutch housing 3 by the flow passages 34, i.e., at input speed. On the other hand, in the area in which flow passages 34 of the feeding device 38 lead into the cutouts 66 of the pressing device 30, the output-side clutch units 40 rotate together with the output-side clutch unit carrier 44 and the torsional vibration damper 48, i.e., at the speed of the driven end 54 formed by the torsional vibration damper hub 56. Since the speed is higher at the clutch housing 3 than at the torsional vibration damper hub 56 as long as the clutch mechanism 90 is not yet fully engaged during the predominantly applied pull operation, the feeding device 38 sucks flow medium out of the pressure chamber 92 via the flow passages 34. At the same time, the feeding device 38 displaces flow medium radially outward into the extension area of the clutch units 20 and 40, where a cooling takes place in the contacting areas thereof. Proceeding from the clutch units 20 and 40, this flow medium arrives at least substantially back in the region of the pressure chamber 92 in which it can be sucked out again via the flow passages 34.

This internal flow circuit initiated by the feeding device 38 is designed for a low idling torque when the vehicle is stationary at idling speed because the increase in flow output of the feeding device 38 is squared in proportion to speed. With increasing speed at the clutch housing 3 and attendant increased starting power loss at the clutch units 20 and 40, the flow output of the flow medium increases advantageously according to a predetermined characteristic curve for the feeding device 38.

Self-evidently, fresh flow medium can be supplied from an external flow source to the internal flow circuit which is triggered by the feeding device 38 so as to maintain an efficient cooling continuously also under frictional load.

The internal flow circuit which is triggered by the feeding device 38 will end as soon as the clutch mechanism 90 is completely engaged and the speeds at the driven end 54 have at least substantially matched the speeds at the clutch housing 3.

Figure 11:
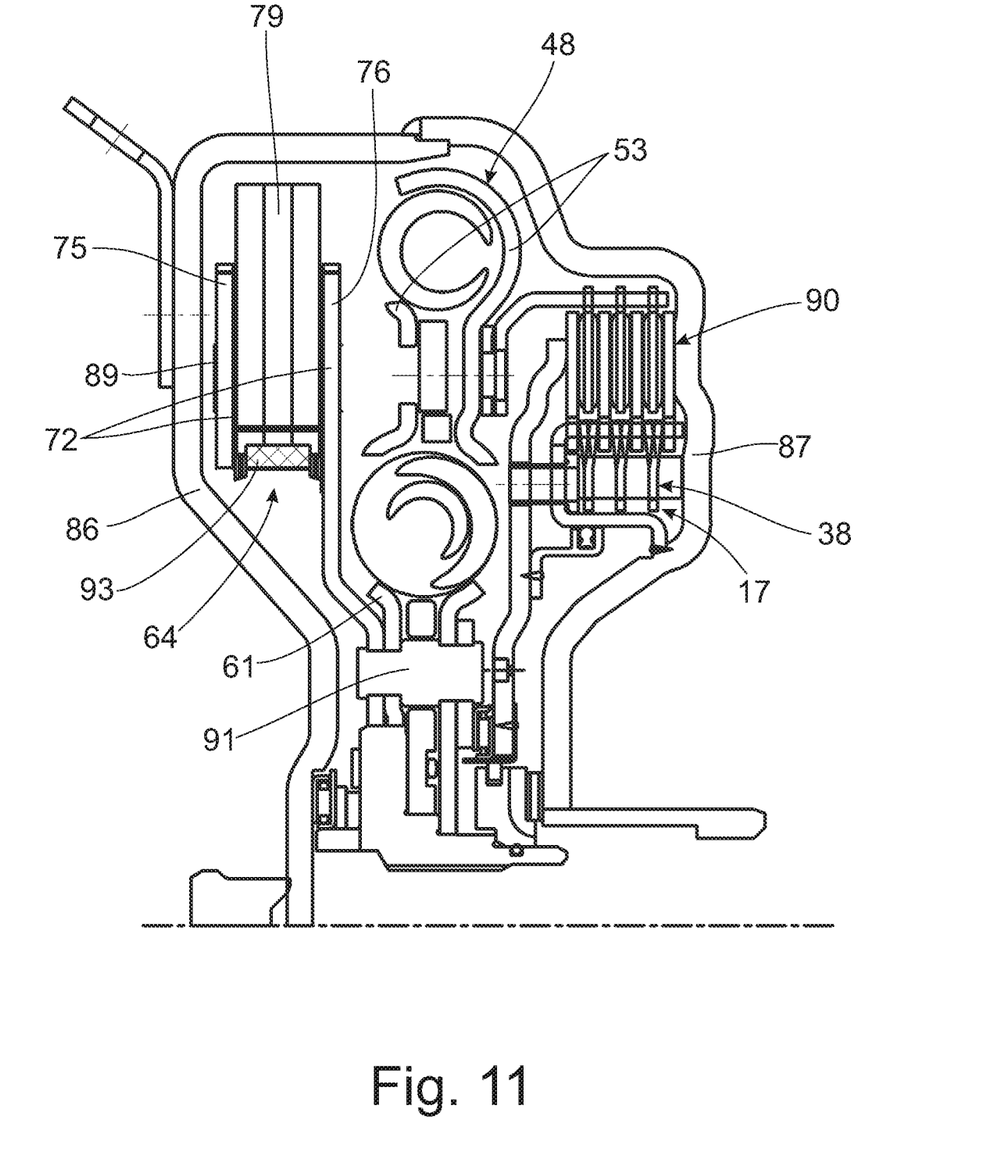
FIG. 11 like FIG. 2, but with a mass damper system connected to the torsional vibration damper.

FIG. 11 shows a coupling arrangement 1 which is identical to the arrangement shown in FIG. 2 with the exception of a mass damper system 64. The mass damper system 64 has a damper mass carrier 72 which has an input-side damper mass carrier element 75 adjacent to the input side 86 and has an output-side damper mass carrier element 76 adjacent to the torsional vibration damper 48. The damper mass carrier elements 75, 76 are spaced apart from one another axially, connected to one another by spacers, not shown, and receive damper masses 79 axially therebetween. The damper masses 79 are preferably formed by a plurality of damper mass segments which are arranged axially next to one another. Like damper masses 79, the damper mass carrier elements 75, 76 have guideways, not shown, which extend in circumferential direction and in radial direction and which serve to receive coupling elements 89. The damper masses 79 are guided in circumferential direction and in radial direction relative to the damper mass carrier elements 75, 76 via these coupling elements 89.

Whereas input-side damper mass carrier element 75 merely serves to receive the coupling elements 89, output-side damper mass carrier element 76 has a connection device 91 at the intermediate transmission device 53 of the torsional vibration damper 48, namely, at the input-side cover plate 61. A stop ring 93 which is fastened to at least one of the damper mass carrier elements 75, 76 and which extends radially inside of the damper masses 79 limits the possible relative movements of the damper masses 79 in circumferential direction and in radial direction in that it acts as a stop relative to the damper masses 79.

Figure 12:
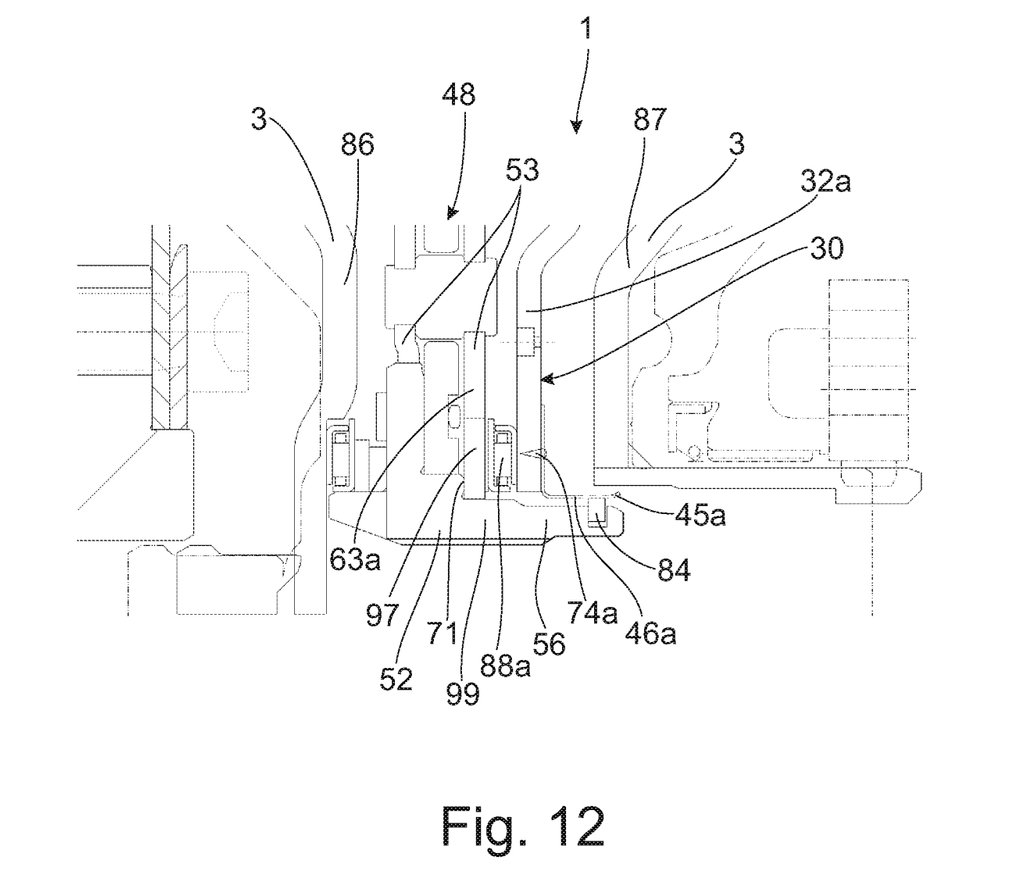
FIG. 12 an enlarged detail of the area—shown in FIG. 2—around the output of the torsional vibration damper, but with a different bearing support of the pressing device.

FIG. 12 shows a construction of the coupling arrangement 1 in the axial extension area of the torsional vibration damper hub 56 which serves as output 52 and, accordingly, as constructional unit 99 of the torsional vibration damper 48. In contrast to FIG. 2, the pressure disk 65 is omitted. Instead, the clutch piston 32a of the pressing device 30 is drawn radially inward virtually up to the torsional vibration damper hub 56 and radially contacts a sealing 84 with the sealing surface 46a of the sealing plate 45a which is connected by weld 74a, this sealing 84 being received in the torsional vibration damper hub 56. The side of the clutch piston 32a of the pressing device 30, which side is remote of the sealing plate 45a, is supported axially at a centering disk 97 in the radial area of the sealing plate 45a via bearing 88a, this centering disk 97 being axially supported in turn at the radial projection 71 of the torsional vibration damper hub 56. The centering disk 97 serves to center the output-side cover plate 63a of the intermediate transmission device 53 of the torsional vibration damper 48.

While the axial support of the torsional vibration hub 56 and, therefore, of the torsional vibration damper 48 in direction of the input side 86 of the clutch housing 3 remains the same, the axial support of the torsional vibration damper hub 56 and, therefore, of the torsional vibration damper 48 in direction of the output side 87 of clutch housing 3 is carried out as follows: the clutch piston 32a of the pressing device 30 is supported in the engagement position at the output side 87 of the clutch housing 3 via clutch units 20 and 40 (see FIG. 2). In this position of the clutch piston 32a of the pressing device 30, the torsional vibration damper hub 56 impinges on the centering disk 97 via radial projection 71; the centering disk 97 is supported via bearing 88a at the clutch piston 32a of the pressing device 30 and, therefore, ultimately at the output side 87 of the clutch housing 3.

As a result of this construction, and in spite of identical functioning, a plurality of component parts such as the pressure disk 65, thrust bearing 60 and second sealing 51 can be omitted compared to the construction according to FIG. 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A coupling arrangement for a powertrain of a vehicle comprising:
   a clutch housing having an input side and an output side and which is rotatable around a central axis;
   a clutch mechanism comprising an input-side clutch units in operative connection with input-side clutch unit carrier which is fixed with respect to rotation relative to the clutch housing and output-side clutch units in operative connection with an output-side clutch unit carrier which is fixed with respect to rotation relative to a torsional vibration damper;
   a pressing device for producing or cancelling an operative connection between the input-side clutch units and the output-side clutch units;
   the torsional vibration damper connecting the clutch mechanism to an output; the torsional vibration damper arranged adjacent the input side of the clutch housing facing a drive, and the clutch mechanism arranged adjacent the output side of the clutch housing facing a driven end; and wherein the pressing device is disposed axially between the torsional vibration damper and the clutch mechanism; and
   a bearing for axially supporting the pressing device at a constructional unit of the torsional vibration damper in a direction facing away from the clutch units and in a direction of the input side.

2. The coupling arrangement according to claim 1, wherein the pressing device is connected via the input-side clutch unit carrier so as to co-rotate with the clutch housing.

3. The coupling arrangement according to claim 1, wherein one of the input-side clutch unit carrier and the pressing device is constructed for receiving a sealing which is operative relative to the other one of the input-side clutch unit carrier and the pressing device.

4. The coupling arrangement according to claim 1, additionally comprising a sealing plate with a sealing surface constructed and disposed so that the pressing device is centered and received in a pressure-tight manner in a radially inward direction on a torsional vibration damper hub serving as the output, the sealing plate contacting a sealing of the torsional vibration damper hub with the sealing surface.

5. The coupling arrangement according to claim 4, wherein the sealing plate is received at a radially inner end of a clutch piston of the pressing device, and axially overlaps the sealing of the torsional vibration damper hub at least to the extent that the contact of the sealing surface of the sealing plate at the sealing is ensured regardless of the respective axial position of the pressing device.

6. A coupling arrangement for a powertrain of a vehicle comprising:
- a clutch housing having an input side and an output side and which is rotatable around a central axis;
- a clutch mechanism comprising an input-side clutch units in operative connection with input-side clutch unit carrier which is fixed with respect to rotation relative to the clutch housing and output-side clutch units in operative connection with an output-side clutch unit carrier which is fixed with respect to rotation relative to a torsional vibration damper;
- a pressing device for producing or cancelling an operative connection between the input-side clutch units and the output-side clutch units;
- the torsional vibration damper connecting the clutch mechanism to an output the torsional vibration damper arranged adjacent the input side of the clutch housing facing a drive, and the clutch mechanism arranged adjacent the output side of the clutch housing facing a driven end; and wherein the pressing device is disposed axially between the torsional vibration damper and the clutch mechanism; and
- a pressure disk for centering and receiving the pressing device in a pressure-tight manner in a radially inward direction on a torsional vibration damper hub.

7. The coupling arrangement according to claim 6, wherein the pressing device comprises a sealing plate at a radially inner end thereof for maintaining the centered, pressure-tight reception at the pressure disk and for guiding a bearing, the sealing plate providing a sealing surface at a side facing the pressure disk; the sealing surface axially overlapping the area of a sealing of the pressure disk at least by an amount corresponding to an axial movement distance of the pressing device.

8. The coupling arrangement according to claim 6, wherein the torsional vibration damper hub serving as the output is axially supported by the pressure disk at the clutch housing in the direction of the output side.

9. A coupling arrangement for a powertrain of a vehicle comprising:
- a clutch housing having an input side and an output side and which is rotatable around a central axis;
- a clutch mechanism comprising an input-side clutch units in operative connection with input-side clutch unit carrier which is fixed with respect to rotation relative to the clutch housing and output-side clutch units in operative connection with an output-side clutch unit carrier which is fixed with respect to rotation relative to a torsional vibration damper;
- a pressing device for producing or cancelling an operative connection between the input-side clutch units and the output-side clutch units;
- the torsional vibration damper connecting the clutch mechanism to an output the torsional vibration damper arranged adjacent the input side of the clutch housing facing a drive, and the clutch mechanism arranged adjacent the output side of the clutch housing facing a driven end; and wherein the pressing device is disposed axially between the torsional vibration damper and the clutch mechanism,
- wherein the pressing device is connected via the input-side clutch unit carrier so as to co-rotate with the clutch housing; and
- a feeding device and wherein the input-side clutch unit carrier receives the feeding device for flow medium contained in the clutch housing so as to be at least substantially fixed with respect to rotation relative to the input-side clutch unit carrier; and feeding device including a driver arrangement for producing a non-rotational connection between the pressing device and the input-side clutch unit carrier.

10. The coupling arrangement according to claim 9, wherein the driver arrangement of the feeding device comprises at least one flow passage engaging in a corresponding cutout of the input-side clutch unit carrier and of the pressing device to connect the feeding device for co-rotation with the input-side clutch unit carrier and with the pressing device.

11. The coupling arrangement according to claim 10, wherein the at least one flow passage engages in the corresponding cutout of the input-side clutch unit carrier and of the pressing device while preserving a positive engagement.

12. The coupling arrangement according to claim 9, wherein the feeding device comprises a support for receiving the driver arrangement and a blading for influencing the movement of the flow medium.

13. The coupling arrangement according to claim 12, wherein the support has the driver arrangement at a side facing the input-side clutch unit carrier and has the blading at a side remote of the driver arrangement.

14. The coupling arrangement according to claim 9, additionally comprising a disconnecting device acting on the clutch units which are adjacent to one another so that the clutch units are acted upon by axial forces in a direction facing away from one another; and wherein the feeding device serves to center the at least one disconnecting device.

15. The coupling arrangement according to claim 14, wherein the disconnecting device is at least substantially annular and surrounds a central axis of the clutch housing.

16. The coupling arrangement according to claim 9, wherein the feeding device is at least substantially annular and surrounds a central axis of the clutch housing.

17. The coupling arrangement according to claim 9, wherein the feeding device is arranged radially inside of the clutch units of the clutch mechanism.

18. The coupling arrangement according to claim 9, wherein that the torsional vibration damper hub serving as the output is axially supported at the clutch housing in a direction of the output side by the pressing device and the clutch units of the clutch mechanism.

19. A coupling arrangement for a powertrain of a vehicle comprising:
- a clutch housing having an input side and an output side and which is rotatable around a central axis;
- a clutch mechanism comprising an input-side clutch units in operative connection with input-side clutch unit carrier which is fixed with respect to rotation relative to the clutch housing and output-side clutch units in operative connection with an output-side clutch unit carrier which is fixed with respect to rotation relative to a torsional vibration damper;

a pressing device for producing or cancelling an operative connection between the input-side clutch units and the output-side clutch units;

the torsional vibration damper connecting the clutch mechanism to an output the torsional vibration damper arranged adjacent the input side of the clutch housing facing a drive, and the clutch mechanism arranged adjacent the output side of the clutch housing facing a driven end; and wherein the pressing device is disposed axially between the torsional vibration damper and the clutch mechanism; and a bearing and a centering disk constructed and disposed so that the pressing device is axially supported at a constructional unit of the torsional vibration damper in direction facing away from the clutch units and in direction of the input side by the bearing and the centering disk.

* * * * *